UNITED STATES PATENT OFFICE 2,423,517

3-KETO-20,21-DIHYDROXY SATURATED PREGNANE COMPOUNDS

Tadeus Reichstein, Basel, Switzerland, assignor to the firm of Roche Organon, Inc., Nutley, N. J.

No Drawing. Original application February 7, 1941, Serial No. 377,915, now Patent No. 2,312,483, dated March 2, 1943. Divided and this application January 27, 1943, Serial No. 473,765

1 Claim. (Cl. 260—397.4)

This invention relates to compounds having a pregnane or pregnene skeleton,

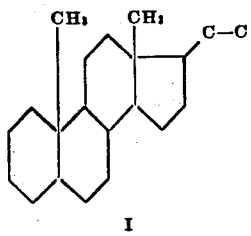

I as illustrated, and having particular substituents at the $C_3$, $C_{20}$, and $C_{21}$ positions, those at the $C_3$ and $C_{20}$ positions being keto groups or hydroxyl groups and those at the $C_{21}$ position being hydroxyl, acyloxyl or alkoxyl groups.

The following type formulas may be considered illustrative of these compounds:

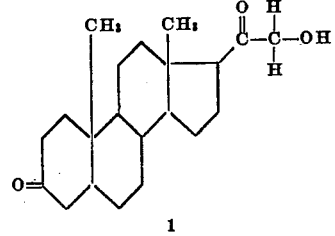

1

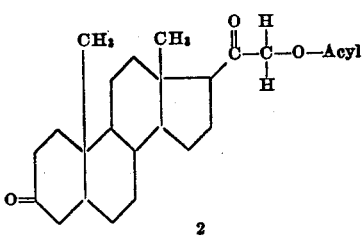

2

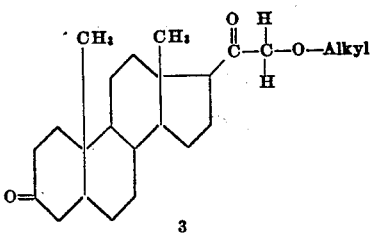

3

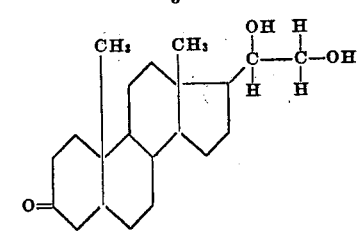

4

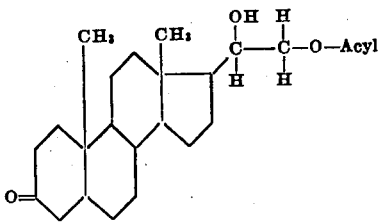

5

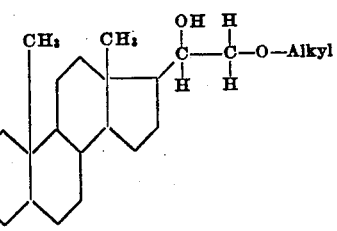

6

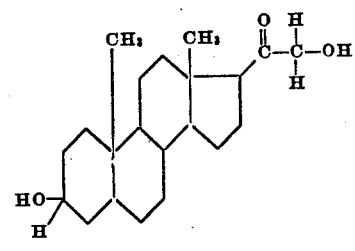

7

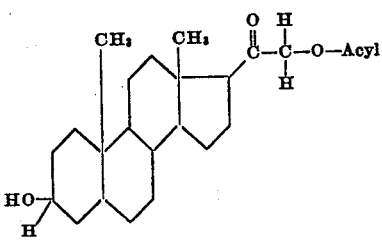

8

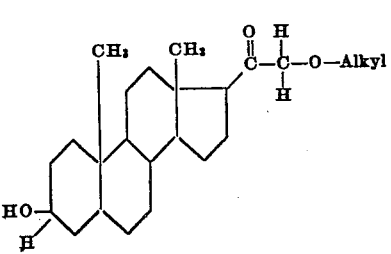

9

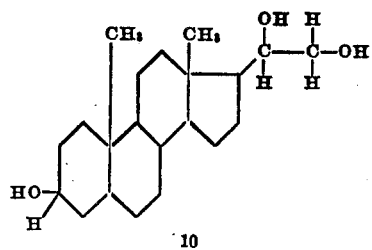
10
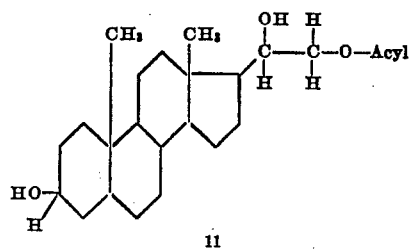
11
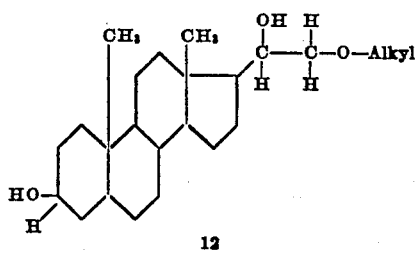
12
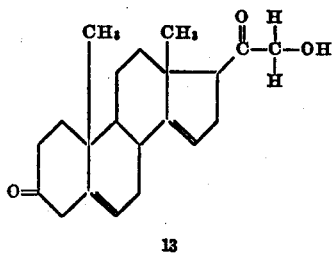
13
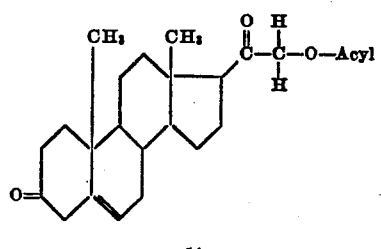
14
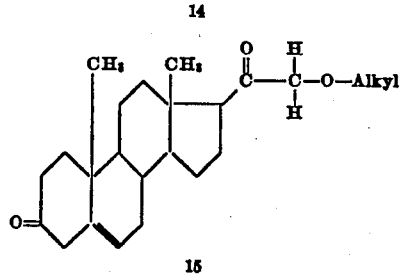
15
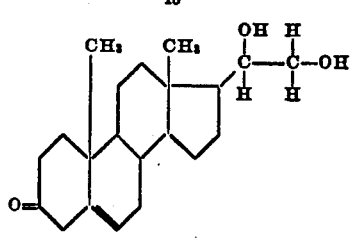
16
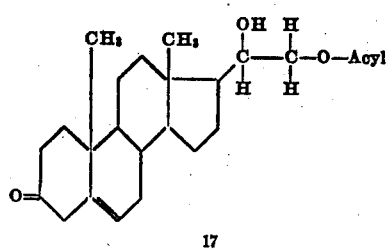
17
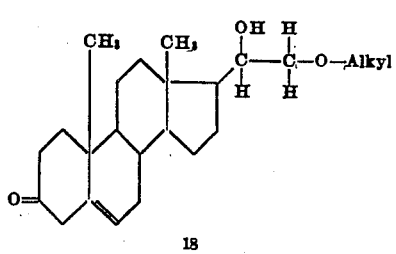
18
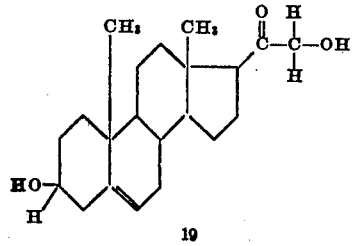
19
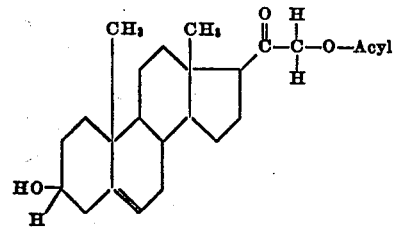
20
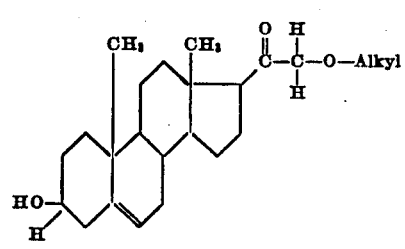
21
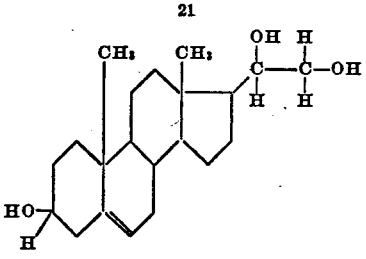
22
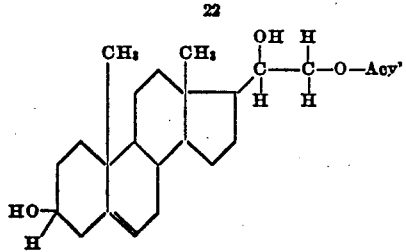
23

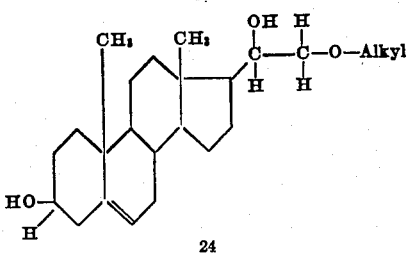

24

In addition to the compounds specifically typified by the above formulas numerous other compounds varying in respects not important to the present invention are also included within the scope thereof. For example, the double bond of Formulas 13 to 24, inclusive, may be in the 4-5 position rather than the 5-6 position as illustrated, or may be in still some other position, the only restriction being that it not be in a position which will interfere with the formation of the compounds by the methods to be described.

Further, the compounds may contain more than one pair of double bonds, or may carry additional substituents attached to the nucleus, subject to the same restriction that such additional double bonds or substituents be such as will not interfere with the reactions necessary to prepare the compounds, or can be added after formation of the compounds without decomposing or otherwise disrupting them. Examples of substituents of the kind mentioned are additional hydroxyl, alkoxy, acyloxy and halogen radicals.

Compounds with a pregnane or pregnene skeleton have prior to the present time been isolated from natural sources or produced by oxydative decomposition of higher molecular weight substances. The production of derivatives of such substances substituted in the carbon atom $C_{21}$ by a halogen or by an oxy group such as an hydroxyl, an acyloxyl or an alkoxyl group has not been described at all. Neither has the preparation of compounds of this type from lower molecular weight compounds such as the etiocholenic or etiocholanic acids been described.

According to the present invention it has been discovered that compounds having a pregnane or pregnene skeleton, substituted at the $C_3$ and $C_{20}$ positions by keto or hydroxyl groups and substituted at the $C_{21}$ position by halogen or an hydroxyl, acyloxyl or alkoxyl group can be prepared from the etiocholenic or etiocholanic acids. In general, the process comprises converting the etiocholenic or etiocholanic acid into an acid halide, reacting the acid halide with diazomethane and hydrolyzing to obtain a 20-keto, 21-hydroxyl compound having the desired skeleton.

When the starting material contains a substituent such as an hydroxyl group or a keto group it is advantageous to protect this group during the reaction mentioned above and this may be done by converting it into an acyloxyl or an alkoxyl group prior to the conversion of the compound into an acid halide.

By varying the conditions under which the acid halide is treated with diazo-methane the resultant product may be caused to be either a 21-diazo derivative or a 21-halogen derivative. Thus, if an excess of diazo-methane is present from the beginning of the reaction, as when the cholenic or cholanic acid chloride is poured into a solution of diazo-methane, then the 21-diazo compound is formed, whereas if the diazo-methane is added slowly to a solution of the cholenic or cholanic acid halide then a 21-halide compound tends to be formed. The addition of a hydrogen halide, if desired after the protected groups in the ring system have been reconstituted by alkaline saponification, will convert the 21-diazo derivatives into 21-halogen derivatives.

Compounds of this type having a free hydroxyl group at the carbon atom $C_{21}$ may be obtained by reacting the 21-diazo ketone with an oxygenous inorganic acid or with an organic sulphonic acid derivative. By reaction of the 21-diazo compounds with organic carbonic acids, derivatives having an acyloxy group at the carbon atom $C_{21}$ may be obtained.

The 21-halogen derivatives may also be converted into 21-hydroxyl derivatives by hydrolyzation with salts of weak organic or inorganic acids or converted into 21-acyloxy derivatives by reaction with organic carbonic acids.

The 21-alkoxyl derivative may be prepared by alkoxylation in the usual way, before removing the protection from the substituents to the nucleus, this protection being subsequently removed by alkaline saponification.

In order to give a clear understanding, the process and some of the numerous variations will be formulated for a distinct simple case. As a starting material we choose 3-oxy-Δ5,6-aetiocholenic acid (Formula II). This acid or its derivatives acylated or alkoxylated in the hydroxyl group can be prepared e. g. from stigmasterol or cholesterol. It is to be understood that the following reactions are given by way of example only and that the invention is not limited thereto.

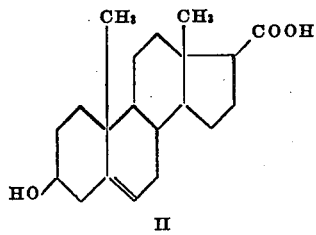

II

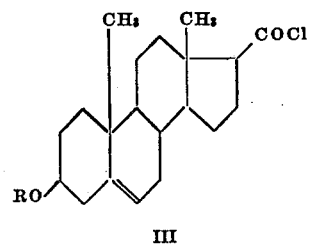

III

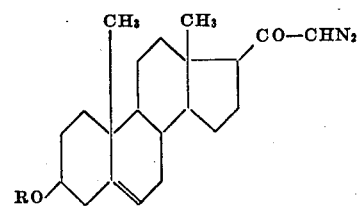

IV

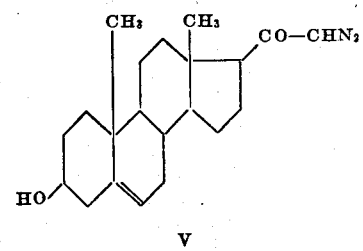

V

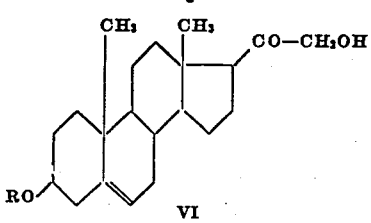

VI

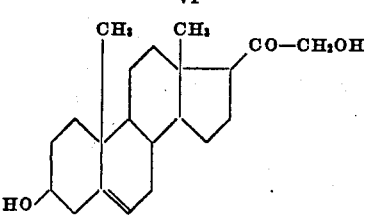

VII

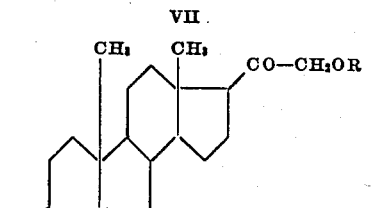

VIII

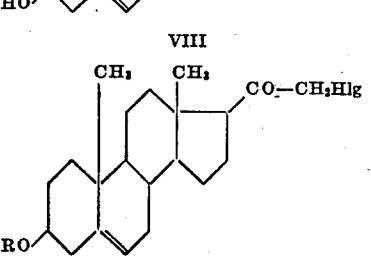

IX

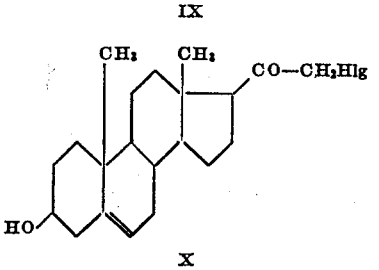

X

If the free acid is used first the hydroxyl group is protected e. g. by acylation or alkoxylation; then the acid is converted into the acid halide (Formula III). Upon reaction of the latter with diazo-methane either the 21-diazo-ketone (IV) or the 21-halogen-ketone (IX) is obtained depending on whether from the beginning an excess of diazomethane is used or whether this is added in successive portions to the acid halide. By careful alkaline hydrolysis the diazo ketone (IV) is converted into the free hydroxyl-diazo ketone (V), provided the hydroxyl group has been acylated and not alkoxylated.

By treatment of the diazo ketone (IV) with an aqueous oxygenous inorganic acid, as e. g. sulfuric acid and phosphoric acids, or with organic sulphonic acids, e. g. toluene sulfonic acid, eventually adding suitable diluents, the derivative (VI) with a free hydroxyl group in the side chain and a protected one in the ring system is obtained. On the other hand treatment of the oxydiazo ketone (V) with organic acids appropriately in absence of water at temperatures ranging from about 60–120° C. leads to derivatives of the Formula VIII, in which the hydroxyl group in the ring system is free and the one in the side chain is acylated. Analogous derivatives, in which the 21-hydroxyl-group is alkoxylized, the one in the ring system being free, can be obtained from (VI) by alkoxylation, e. g. with triphenyl methylchloride and subsequent alkaline saponification. The derivative (VII) in which both hydroxyl groups are free can be prepared either from (V) with oxygenous acids or from (VI) by acid hydrolysis, hence it may also be obtained directly from (IV) by prolonged treatment with e. g. warm aqueous sulfuric acid etc., eventually diluents being added. Treatment of (IV) with organic acids leads to diacyl derivatives with identical or different acyl residues; analogous derivatives can be obtained from VI, VII and VIII by acylation.

By treatment of (IV) with a hydrogen halide the corresponding halogen ketone (IX) with a protected hydroxyl group are obtained. If this hydroxyl group had been acylated or alxokylated with alkyls which can easily be eliminated the oxy-halogen ketone (X) can be prepared from (IX) by acid hydrolysis. This oxy-halogen ketone (X) is easily obtained from (V) with a hydrogen halide.

The reactions mentioned can with the exception of the alkaline hydrolysis also be carried out after preceding saturation of the double bond e. g. with bromine. All of them can be carried out in the presence of diluents.

Analogous reactions may be carried out starting e. g. with the well-known 3-oxy-aetio-allocholanic acid (Dalmer, Werder, Honigmann, Hayns, Ber. 68, 1814, 1936) and with other substituted derivatives of the aetio-cholanic or cholenic acids series carrying further substituents in the ring system besides those at the carbon atom $C_3$ especially oxygen as a hydroxyl group or in ether- or oxide-like bonds.

Most of the derivatives of pregnanolone substituted in the carbon atom $C_{21}$ are well crystallized compounds. If the substituent at the carbon atom $C_{21}$ is a halogen, a hydroxyl or an acyloxyl group the substances are very sensitive to alkalies and rapidly reduce an ammoniacal silver solution at ordinary temperatures.

EXAMPLES

For the sake of simplicity the examples will concern the case mentioned above.

1. *Production of diazo ketones*

The 3-oxy-aetio-cholenic acid or its derivatives acylated or alkoxylated in the hydroxyl group used as a starting material can be obtained by oxydative decomposition of 3-oxy-bis-nor-cholenic acid (Fernholz, Liebigs, Ann. 507, 128, 1933) by way of a number of intermediate products. The free oxy-acid forms colourless crystals melting with decomposition at 280–288° C. (corrected) differences being observed at different velocities of heating. Its methylester forms needles from benzene melting at 180° C. (corrected). The acylated acid melts at 240–242° C. (corrected), its methylester at 153–154° C. (corrected).

One g. of 3-acetoxy-aetio-cholenic acid is boiled with reflux for 3 hours with 5 ml. of benzene and 5 g. of very pure thionyl chloride. Then the mixture is evaporated, humidity being excluded, upon which the acid chloride soon crystallizes. The weakly yellow product does not show a distinct melting point but decomposes at different temperature depending on the velocity of heating.

Sometimes melting at 160° C. may be observed followed by resolidifying and eventually melting again of the decomposed mass at a temperature over 300° C. The chloride is dissolved in 80 ml. of dry ether and poured into a dry ethereal solution of 1-1.5 g. of diazomethane, the temperature being —10° C.

The mixture is left to stand for some hours at 0° C., then for 6 hours at room temperature after which it is concentrated. Petroleumether is added until a turbidity occurs. The diazo ketone crystallizes. From the mother liquor additional amounts are obtained in analogous ways. Yield 0.7 g. of a pure product, weakly, pale yellow leaflets, melting point approaching 150° C. somewhat different depending on the velocity of heating.

For the preparation of the free diazo-21-pregnene-5-ol-3-one-20, one g. of the above acetate is suspended in 30 ml. of methanol, 16 ml. of a 5% solution of potassium hydroxide in methanol are added and the mixture is left to stand at room temperature for 6 hours with occasional agitation. The crystals dissolve after about half an hour. Then some water is added and after concentration in vacuo the oxy-diazo ketone crystallizes. It is filtered with suction washed with water and dried in vacuo; it can be recrystallized from ether-petroleumether, it then being obtained in pale yellow lustrous grains melting at 144° C. with vigorous decomposition; upon slow heating the melting point can be found lower. The yield is almost quantitative. The product is distinguished from the acylated diazo ketone by its being precipitated by digitonine from a 80-90% alcoholic solution.

2. Production of the halogen ketones 0.2 gram of the acetate of diazo-21-pregnene-5-ol-3-one-20 is suspended or dissolved in ether and an ethereal solution of dry hydrochloric acid is added until the stormy development of gas has finished. Then the ether and the excessive hydrochloric acid are evaporated in vacuo and the residue is recrystallized from ether upon addition of pentane and subsequently from methanol; the acetate of chloro-21-pregnene-5-ol-3-one-20 is obtained in colourless needles with melting point 157-158° C. (corrected); its composition is $C_{23}H_{33}O_3Cl$.

The same compound is obtained if at room temperature a solution of diazomethane is added drop by drop to an agitated solution of acetoxyaetiocholenic acid chloride.

0.1 g. of the acetylated chloro-ketone is boiled with reflux for one hour with 2 ml. ethanol and 0.15 ml. concentrated aqueous hydrochloric acid, the mixture is concentrated in vacuo and the residue is recrystallized from ether-petroleumether or from a small quantity of ethanol. From the latter the chloro-21-pregnene-5-ol-3-one-20 is obtained as colourless needles melting at 162-164° C. The same chloro-ketone is obtained upon treatment of the diazo-21-pregnene-5-ol-3-one-20 (Example 1) with hydrochloric acid. The compound is precipitated with digitonine and is so distinguished from its acetylation product. An ammoniacal silver solution is rapidly blackened at room temperature by both chloroketones.

3. Production of oxy-ketones with a free hydroxyl group in the side chain 0.15 gram of acetoxy-diazo ketone (Example 1) is dissolved in 2 ml. of dioxane; upon addition of 1.5 ml. of 2 N sulfuric acid a production of gas begins which is completed by heating to about 40° C. The mixture is diluted with water and extracted with ether; the ethereal solution is washed with a solution of sodium-carbonate, dried and evaporated to dryness in vacuo. For further purification the product can be sublimated in vacuo and recrystallized from ether by concentration. In this way the pregnene-5-diol-3, 21-one-20-acetate-3 is obtained in colourless crystals which shows a correct composition ($C_{23}H_{34}O_4$) yet generally do not melt very sharply at about 150-155° C. Evidently they easily attract water; the compound strongly reduces ammoniacal silver solution and is not precipitated by digitonine.

To produce the free dioxy-ketone 0.1 g. of the above mono-acetate is dissolved in 2 ml. of methanol and boiled with reflux for one hour with 2 ml. of water and 0.15 ml. of concentrated hydrochloric acid. Then the mixture is evaporated to dryness in vacuo, the residue is dissolved in a small quantity of acetone and precipitated by the additon of water, eventually sublimated in a high vacuum and recrystallized from acetone-ether by concentration. The pregnene-5-diol-3, 21-one-20 is thus obtained in colourless leaflets which may be clustered together and may contain some solvent, the melting point generally not being very distinct at 155-160° C. (corrected) notwithstanding the correct composition ($C_{21}H_{32}O_3$).

Often a second melting point can be observed. The same compound is obtained from the oxydiazo ketone (Example 1) with aqueous sulfuric acid. It reduces an ammoniacal silver solution and is precipitated by digitonine.

4. Production of partially acylated oxy-ketones with a free hydroxyl group in the ring system (a) 0.2 g. of diazo-21-pregnene-5-ol-3-one-20 (Example 1) is heated for about 30 minutes at 90° C. with 2 ml. of the purest glacial acetic acid after which the production of gas is finished. After cooling part of the acetoxy ketone crystallizes in beautiful needles. It is suctioned off and washed with ether-pentane. From the mother liquor the residual amount is obtained after evaporation in vacuo. The yield is 0.21 g. The needles contain solvent of crystallization: they become opaque near 80° C. and melt at 180-182° C. (corrected). After effective drying the composition is found to be the calculated one ($C_{23}H_{34}O_4$). The compound is precipitated by digitonine and reduces an ammoniacal silver solution. The same compound can be obtained from the chloro-21-pregnenelone (Example 2) upon heating with potassium acetate in ethanol or glacial acetic acid or with lead acetate and dioxane; however, this is not advantageous.

(b) 0.1 g. of diazo-21-pregnene-5-ol-3-one-20 is dissolved in 0.5 ml. of dry dioxane by gentle heating and after addition of 0.25 g. of benzoic acid gradually further heated to 110-120° C. until the end of the evolution of gas, which takes about 25 minutes.

The further treatment consists of dissolution in ether washing with sodium-carbonate solution and water-drying and evaporating in vacuo. The residue crystallizes from methanol and is obtained by dissolving in acetone-methanol and subsequent concentration in spherical aggregated, which first melt unsharply near 140° C., then soon solidify to lustrous grains to melt again at 171-175° C. The composition corresponds to the pregnene-5-diol-3,21-one-20-benzoate-21.

5. Derivatives partially alkoxylated in the side chain 0.1 g. of pregnene-5-diol-3,21-one-20-acetate-3 (Example 3a) is dissolved in 0.25 ml. of pyridine and to it is added at 0° C. a solution of 75 mg. of triphenyl-methyl chloride in 0.25 ml. of benzene. The mixture is left to stand first one hour at 0° C. and subsequently two days at room temperature. Then it is poured into an aqueous solution of sodium-carbonate and shaken with ether. The ethereal solution is washed with water dried and concentrated, residual pyridine being eliminated in vacuo by gentle heating. The residual trityl compound, a thick syrup containing a little triphenyl-carbinol, can be treated further in this form.

To saponify the acetoxy-group it is dissolved in methanol and upon addition of an excess of potassium hydroxide in methanol the mixture is left to stand at room temperature for several hours. Then water is added followed by extraction with ether and washing, drying and evaporating the ethereal solution.

The trityl compound with a free hydroxyl group at the carbon atom $C_3$ remains as an almost colourless resin contaminated with a little triphenyl-carbinol. It may however be used for further conversions as well, e. g. oxidation of the hydroxyl group to a keto group (cf. application Serial No. 195,162).

The trityl compound hardly reduces an ammoniacal silver solution in the cold.

The compounds above described may be converted into compounds having a keto group at the 3-position by careful oxidation e. g. with chromic acid. In accordance with the principles of this invention it has been discovered that this may be done without affecting or damaging the sensitive side chain despite the fact that these side chains are extremely sensitive to many oxidizing agents, for example, being easily oxidized in the side chain by a cold ammoniacal silver solution.

Special care is necessary if a double bond is present in the molecule especially one between the carbon atoms $C_5$ and $C_6$ as it is well known that in these cases the oxidation takes place in the double bond. In this case the double bond may be effectively protected according to known methods e. g. by addition of a halogen of a hydrogen halide and regeneration of the double bond after oxydation with simultaneous displacement of the double bond. However this treatment is only applicable to those derivatives bearing a protected hydroxyl group at the carbon atom $C_{21}$. If a halogen is present at the carbon atom $C_{21}$ the elimination of the halogen from the ring system would cause undesired reactions in the side chain.

In the case of unsaturated derivatives with one double bond at the carbon atom $C_5$ the reaction can be carried out, simultaneously replacing the halogen by a hydroxyl or an acyloxyl group, as follows: After addition of a halogen and oxydation the product is heated with salts of organic or weak inorganic acids until the halogen in side chain has been replaced by a hydroxyl or an acyloxyl. Simultaneously one mol. of hydrogen halide is eliminated from the ring system, an unsaturated mono-halogenated ketone thus being produced. The halogen remaining at the carbon atom $C_6$ can then be eliminated by reduction. This modification of the process is not particularly advantageous if derivatives substituted at the carbon atom $C_{21}$ with oxygenous groups are to be prepared so that it is then preferred to start with derivatives bearing a protected hydroxyl group at the carbon atom $C_{21}$. With saturated derivatives, however, the exchange of a halogen at the carbon atom $C_{21}$ against a hydroxyl or a protected hydroxyl group does not meet with difficulties.

The polyketones with a free hydroxyl group at the carbon atom $C_{21}$ are obtained by saponification of the corresponding derivatives with a hydroxyl group which had been acylated or alkoxylated with alkyls which can be easily eliminated by hydrolysis or alkoholysis preferably avoiding strongly alkaline agents although strong acids may be used in most cases. The hydroxyl-21-ketones can also be prepared from the halogen-21-ketones by the action of salts of organic or weak inorganic acids in the presence of water or alcohols. As stated above, however, this is only applicable to the saturated derivatives.

Afterwards the hydroxyl group at the carbon atom $C_{21}$ can again be acylated or alkoxylized. All of the reactions mentioned can appropriately be carried out in the presence of solvents or diluents. Moreover it is unnecessary to separate the compounds formed as intermediates. The process will be elucidated by formulation of a simple case viz. the preparation of derivatives of pregnene-4-dione-3,20, substituted in the carbon atom $C_{21}$.

Afterwards examples will be given for the preparation of the compounds concerned.

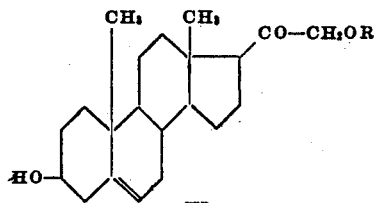

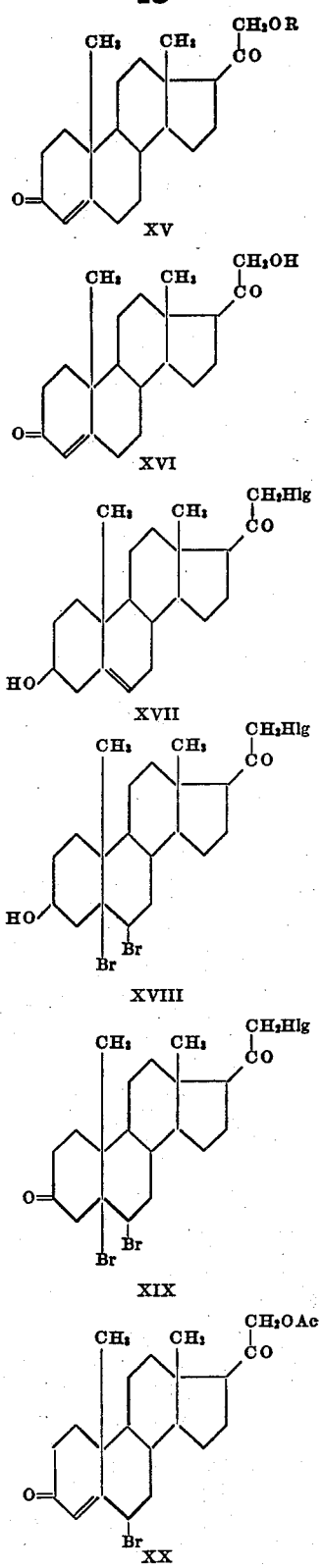

For example one starts with acetoxy-21-pregnene-5-ol-3-one-20 (Formula XI, R=acetyl). Bromine is added whereupon the dibromide (XII) is oxidized with oxidizing agents e. g. chromic acid whereby the dibromoketone (XIII) is formed. From this with reducing agents the unsaturated ketone (XIV) is formed which is converted by the action of an acid with displacement of the double bond into the isomeric unsaturated ketone (XV). Upon saponification of this compound the free hydroxy diketone (XVI) is obtained. The way used for unsaturated halogen-21-ketones is illustrated by Formulae XVII etc. After saturation of the double bond with bromine to obtain (XVIII) this is oxidized to (XIX) and by treatment with sodium acetate etc. this gives the ester of the unsaturated bromoketone of the probable Formula XX. From this the bromine atom can be removed with reducing agents, the diketone (XV, R=acyl) thus being formed.

In analogous ways the derivatives of pregnene with more than one free hydroxyl group in the ring system and halogen or a protected hydroxyl group at the carbon atom $C_{21}$ can be converted into the corresponding polyketones. The compounds obtained will be used for the preparation of medicines.

*Example 6*

1 g. of acetoxy-21-pregnene-5-ol-3-one-20 (crystals with M. P. 180–182°) (corrected) is dissolved in 5 ml. chloroform and to this is added a solution of 0.45 g. of bromine in chloroform at 0° C. only the last drops causing a permanent yellow colour. Shortly afterwards the solution is evaporated in vacuo, the residues being dissolved in a little glacial acetic acid and to this a solution of 0.75 g. of chromic acid in 30 ml. glacial acetic acid is added. The mixture is left to stand at room temperature for 12 hours. Then it is poured into water and the precipitating bromoketone is shaken out with ether. The ethereal solution is washed with some water, dried for a short period, and to it is added 2 g. of powdered zinc and 1 g. of water-free sodium-acetate. The ether is evaporated, shaking now and then, the temperature of the bath being 60° C. and the residue is heated at the same temperature with frequent shaking for another 30 minutes, but at all events until a sample poured in water and extracted with ether has become free of bromine. Then the reaction mixture is taken up in ether, the solution is filtered, washed with water and evaporated. The crystalline residue is heated for 5 to 10 minutes with glacial acetic acid until gentle boiling and thereafter evaporated to dryness in vacuo. For purification the crystals can be sublimed in a high vacuum (a bath temperature of 190° and a pressure of 0.02 mm. gives with small amounts a sufficient velocity of distillation provided the heated surface is large enough) followed by recrystallization from a small quantity of acetone, some petroleum ether being added.

Some 0.7 g. of pure acetoxy-21-pregnene-4-dione-3,20 are obtained as colourless needles which upon heating become opaque near 60° C. and melt at 158–160° C. (corrected). After being well dried their composition is $C_{23}H_{32}O_4$. A solution in ethanol or methanol rapidly reduces a cold ammoniacal silver solution in the cold and its ultra-violet absorption spectrum shows the band at about 240 m$\mu$ characteristic of alpha-beta-unsaturated ketones. The compound is very soluble in glacial acetic acid, ethanol, methanol, acetone, dioxane and benzene, to a considerable extent in ether and only difficultly soluble in petroleum ether and water.

In the reduction with zinc one may heat more intensely from the beginning whereby the subsequent treatment with glacial acetic acid to shift the double bond becomes unnecessary. Of course also other reducing agents can be used, so e. g. the debromination can be effected by heating for one hour with excessive sodium iodide, the same compound being formed. If ethanol is used as a solvent the acetyl group at the carbon atom $C_{21}$ is often partially saponified, a free hydroxyl-group being formed. Of course with the benzoate and other esters as a starting material the reactions proceed quite analogously.

Example 7

0.2 g. of the above acetoxy-21-pregnene-4-dione-3,20 is dissolved in 10 ml. of ethanol, 10 ml. of water and 1 ml. of concentrated hydrochloric acid are added after which the mixture is boiled with reflux for 40 minutes. After cooling the solution is concentrated in vacuo until beginning turbidity, after which it is left to crystallize. The well-developed colourless crystals are filtered with suction, washed with strongly diluted ethanol and then with water and finally dried in the air. From the mother liquor the residual fraction is obtained by concentration.

Upon heating the crystals of pregnene-4-ol-21-dione-3,20 become opaque somewhat over 100° C. and melt at 137–139° C. After drying the composition is $C_{21}H_{30}O_3$. Their solution reduces a cold ammoniacal silver solution; it shows in the ultraviolet absorption spectrum the bands characteristic for cholestenone. The solubility is like that of the acetate, however, somewhat smaller in solvents not containing hydroxyl groups. From a small quantity of acetone well developed, characteristic long needles are obtained which often take the form of triangles or of cut triangles. The compound can be sublimated in a high vacuum without decomposition; at 0.02 mm. pressure and 190° bath temperature with a large heating surface the velocity of distillation is sufficient for small quantities.

It may be prepared in analogous ways from other esters and it can again be converted into other esters whilst with alkoxylating agents not having strongly alkaline reaction the ethers can be obtained.

Example 8

0.3 g. of crude triphenylmethoxy-21-pregnene-5-ol-3-one-20 is dissolved in chloroform and treated with 0.08 g. of bromine in chloroform as described in Example 6.

After evaporation in vacuo the residue is dissolved without heating in the required amount of glacial acetic acid and 0.15 g. of chromic acid in 7 ml. of glacial acetic acid are added.

After standing for 8 hours at room temperature the mixture is poured into water and shaken out with ether; the ethereal solution is washed with water and dried over sodium sulfate, 0.5 g. of powdered zinc and some sodium acetate are added, the ether is evaporated on a water bath and the residue after addition of some ethanol is heated for another hour on a boiling water bath whereby besides debromination also displacement of the double bond and elimination of the triphenylmethyl residue from the molecule occurs. The ethanol is evaporated in vacuo, ether is added and the solution is filtered, washed with water and sodium carbonate solution, dried and evaporated. For complete elimination of the triphenylmethyl group the residue may be heated again with aqueous ethanol and hydrochloric acid and thereupon evaporated to dryness in vacuo. The triphenylcarbinol formed can then be eliminated by partitioning the mixture between aqueous ethanol or about 50% methanol and petroleum ether. From the aqueous alcoholic solutions the pregnene-4-ol-21-dione-3,20 is obtained as described in Example 7.

Example 9

0.22 g. of chloro-21-pregnene-5-ol-3-one-20 (colourless needles; M. P. 162–164° C., corrected) is brominated in chloroform with 0.108 g. of bromine and thereafter treated at room temperature with 0.2 g. of chromic acid, as described above. The mixture is poured into water and shaken out with ether. The ethereal solution is washed with water, dried and evaporated at 50° C.

The residue is heated for several hours on a water bath with 3 ml. of glacial acetic acid and 0.8 g. of water-free sodium acetate. Then 0.5 g. of powdered zinc is added and the heating is continued for about half an hour, depending on the quality of the zinc but at all events so long that a sample poured into water and taken up in ether is practically free of halogen. Then the mixture is diluted with much ether, filtered, washed with water and sodium carbonate solution and evaporated to dryness. Appropriately the residue is first distilled in a high vacuum followed by absorption e. g. on active aluminum oxide from benzene-petrolether solution and elution with ether and acetone. Finally the product is recrystallized as described in Example 1. The crystals formed are identical with those described there.

For the reaction of saturated halogen-21-pregnane-derivatives with sodium acetate in glacial acetic acid, it is advantageous to heat to somewhat higher temperatures, e. g. 3 hours at 130° C.; then the acetoxy-21-ketones are immediately obtained in pure form. However, with the dibromo-derivatives it is better not to heat too intensely.

Compounds of the type described containing an hydroxyl group at the $C_{20}$ position may be prepared from compounds containing a keto group at the $C_{20}$ carbon atom by carefully reducing the compound so that the carbonyl group at $C_{20}$ is converted into a hydroxyl group.

The resultant compound is a mixture of two stereoisomers. This isomerism is due to the reduction of the carbonyl group. The two isomers also form two different acetal compounds. A separation of these two acetal compounds may be effected if desired by chromato-graphic analysis or by fractional crystallization.

For example products having hydroxyl groups at each of the positions 3, 20 and 21 may be prepared from compounds having either protected or unprotected hydroxyl groups at $C_3$ and/or $C_{21}$ and a keto group at $C_{20}$ by careful reduction, e. g., with isopropyl alcohol and aluminum isopropylate, according to Meerwein-Pondorff. If acyl derivatives are used as the starting material the reduction product must be saponified to reconvert the acyloxy radicals to hydroxyl radicals. In this way compounds may be obtained having three hydroxyl groups at the 3, 20 and 21 positions. To illustrate this latter process the following specific example is given:

Example 10

Pregnene-5-diol-3.21-one-20 or its derivatives acylated in the hydroxyl groups at $C_3$ and/or $C_{21}$ are carefully reduced, e. g., with isopropyl alcohol and aluminium isopropylate, according to Meerwein-Pondorff. If acyl derivatives were used the reduction product must further be saponified. In this way the free pregnene-5-trio-3.20.21 can be obtained as a mixture of two isomers forming colourless crystals melting at 204–218°.

A way of preparing compounds of the type herein described having a keto group at $C_3$ and hydroxyl groups at $C_{20}$ and $C_{21}$ comprises treating the triol 3,20,21 compound with acetone to form a mono-acetone 20.21 compound, and oxidizing to form a keto group at $C_3$ and thereafter hydrolizing to free the hydroxyl groups at $C_{20}$ and $C_{21}$. The details of this process will be more clearly apparent from a consideration of the following specific examples:

*Example 11.—Preparation of mono-acetone compound*

570 mg. of triol were dissolved in 300 cm.$^3$ of dry acetone and shaken for 6 days with 6 g. of anhydrous copper sulfate. The copper sulfate was thereupon filtered off, the solution was shaken with potassium carbonate and evaporated to dryness. The crystalline residue was sublimated in a high vacuum (0.01 mm. and 140–160°). A non-distillable residue remained. The sublimate was recrystallized from ether-pentane. The yield was 355 mg. of crystals melting at 146° (corrected), resolidifying upon further heating and melting again at 166–169° (corrected).

$$(\alpha)_D^{21} = -51 - 3°$$

(c.=2.737 in acetone).

The compound gives an intense yellow colour with nitro-methane showing the presence of a double bond.

*Example 12.—Oxidation of mono-acetone compound*

375 mg. of the monoacetonepregnenetriol prepared according to Example 11 were dissolved in 8 cm.$^3$ of dry acetone and refluxed for 14 hours with a solution of 0.8 g. of aluminium tertiary butylate in 30 cm.$^3$ of benzene. Then the acetone was removed, the solution taken up in ether and washed subsequently with a concentrated Seignette salt solution, sodium carbonate solution and water. The washings were again extracted with ether and added to the bulk of the extract. The united ethereal extracts were then dried and evaporated leaving as a residue 550 mg. of a slightly yellow oil which was further fractionally distilled in a high vacuum the pressure being 0.005 mm. Hg. At 50° bath temperature a first running came over which was discarded. The bulk of the mass passed at about 170°; its weight was 390 mg.

*Example 13.—Fractionation of monoacetone-20.21-pregnene-4-one-3-diol-20.21*

The product of Example 12 (390 mg.) was dissolved in 5 cm.$^3$ of pentane and filtered through a column of 5 g. of aluminium oxide. The column was washed twice with pentane which hardly eluted any material. Then the washing was repeated twice with a mixture of 20% benzene and 80% pentane. Still the eluate contained only small amounts of solids which were worked up later together with the mother liquors remaining after the crystallization of the α-form.

Now the elution was continued with a mixture of equal parts of pentane and benzene until practically no more solids were eluted. Upon evaporation the oxidation product crystallizes. The column was further washed with ether which eluted 50 mg. of unchanged starting material.

The ketone fraction was recrystallized from pentane whereby a part was obtained as pure crystals melting at 124–125°.

The lower melting and the syrupy components were now again subjected to a chromatographic separation whereupon the several eluates with 50% benzene-pentane were worked up separately. In all 245 mg. crystals of the α-form (M. P. 122–124°) were obtained. After recrystallization from pentane the melting point rose to 126° (corrected). $(\alpha)_D^{20} = +91.5° \pm 1°$ (c.=2.252 in acetone).

The α-mono-acetone-pregnene-4-diol-20.21-one-3 is easily soluble in all organic solvents with the exception of petroleum ether. In water it is practically insoluble.

The mother liquors from the crystallization of the α-form and the fraction which was obtained in the chromatographic separation only upon extraction with ether were united (180 mg.) and again refluxed with a 4 cm.$^3$ of acetone, 15 cm.$^3$ of benzene and 0.4 mg. of aluminium tertiary butylate and worked up as described above. The chromatographic analysis is also repeated as described above but now gave as the main product the β-form of the mono-acetone-pregnene-4-diol-20.21-one-3. When recrystallized from pentane it was obtained in colourless leaflets melting at 132° which gave a strong melting point depression with the α-form described above. Yield 70 mg. $(\alpha)_D^{20} = +70.5° \pm 1.5°$ (c.=1.701 in acetone).

*Example 14.—Preparation of free pregnene-4-diol-20.21-one-3*

*α-form.*—235 mg. of α-mono-acetone compound obtained according to Example 13 were dissolved in 8 cm.$^3$ of ethanol and upon addition of 10 cm.$^3$ of water and 2.5 cm.$^3$ of glacial acetic acid the solution was refluxed for 2 hours on a water bath. Then it was evaporated to dryness in vacuo whereupon the same treatment was twice repeated. The crystalline residue so obtained was extracted five times with ether which dissolved it almost completely. Upon evaporation 120 mg. of crystals melting at 166–176° (corrected) were obtained. $(\alpha)_D^{20} = +92.6° \pm 1°$ (c.=1.932 in abs. ethanol). The substance is easily soluble in ethanol and acetone, difficultly soluble in ether and hardly soluble in petroleum ether.

*β-form.*—This one was prepared from the corresponding acetone compound in exactly the same way as the α-compound. The melting point, however, was 183–185° (corrected). The mixed melting point of α- and β-forms was 138–155° (corrected).

The new compounds as described and obtainable according to this invention can be used as therapeutics or the intermediate products for the synthesis thereof.

This application is a division of my copending application Serial No. 377,915, which in turn is a continuation-in-part of my copending applications Serial No. 195,161 filed March 10, 1938; Serial No. 195,162 filed March 10, 1938; and Serial No. 250,025 filed January 9, 1939.

I claim:
The compound

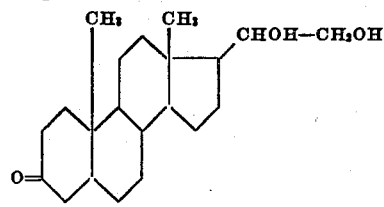

TADEUS REICHSTEIN.